United States Patent
Cortina-Cordero

(10) Patent No.: US 7,739,843 B2
(45) Date of Patent: Jun. 22, 2010

(54) PRE-STRESSED CONCRETE TOWER FOR WIND POWER GENERATORS

(76) Inventor: Alejandro Cortina-Cordero, AV.Prolongacion Reforma 115-901, Col. Paseo de las Lomas, D. F: 01330 (MX)

( * ) Notice: Subject to any disclaimer, the term of this patent is extended or adjusted under 35 U.S.C. 154(b) by 0 days.

(21) Appl. No.: 12/111,145

(22) Filed: Apr. 28, 2008

(65) Prior Publication Data

US 2009/0031639 A1 Feb. 5, 2009

Related U.S. Application Data

(63) Continuation of application No. PCT/IB2007/003319, filed on Nov. 2, 2007.

(30) Foreign Application Priority Data

Aug. 3, 2007 (MX) .................. MX/A/2007/009456

(51) Int. Cl.
*E04C 5/08* (2006.01)
*E04C 3/00* (2006.01)
*E02D 27/32* (2006.01)
*E04G 21/00* (2006.01)

(52) U.S. Cl. .......................... 52/223.5; 52/296; 52/848; 52/745.17; 416/DIG. 6

(58) Field of Classification Search .................. 52/834, 52/848, 851–853, 843–845, 223.4, 223.5, 52/745.17, 745.18, 742.14, 742.16, 223.1; 416/DIG. 6
See application file for complete search history.

(56) References Cited

U.S. PATENT DOCUMENTS

| 21,074 A | 8/1858 | Milliken |
| 154,393 A * | 8/1874 | Hill .......................... 52/223.5 |
| 311,710 A | 2/1885 | Annable |
| 629,078 A | 7/1899 | Holz |
| 666,146 A * | 1/1901 | Lanz ........................... 52/843 |
| 1,013,039 A | 12/1911 | Moore |
| 1,115,588 A | 11/1914 | Scott et al. |
| 1,174,501 A | 3/1916 | Hughes et al. |
| 1,299,787 A | 4/1919 | Schluter |

(Continued)

FOREIGN PATENT DOCUMENTS

CA 2 463 253 4/2003

(Continued)

OTHER PUBLICATIONS

Wind Blatt; The Enercon Magazine; Special: Service staff on the road; Issue Mar. 2001.

(Continued)

*Primary Examiner*—Robert J Canfield
*Assistant Examiner*—Brent W Herring
(74) *Attorney, Agent, or Firm*—Birch, Stewart, Kolasch & Birch, LLP

(57) ABSTRACT

A pre-stressed segmented concrete tower for wind power generators is described, and a method for its fabrication, wherein in a pyramidal structure is formed by prefabricated segments, the structure comprising three rounded walls formed with semi-circular segments, and three flat walls, formed with flat segments between the semi-circular walls. One standard curved mold is used for the semi-circular walls, and the flat walls are fabricated horizontally, over templates.

13 Claims, 7 Drawing Sheets

U.S. PATENT DOCUMENTS

| | | | |
|---|---|---|---|
| 1,567,301 A | | 12/1925 | Ross |
| 1,652,403 A | | 12/1927 | Gerdeman |
| 1,750,600 A | | 3/1930 | Houghtalind |
| 1,834,842 A | | 12/1931 | Houghtaling |
| 2,049,371 A | * | 7/1936 | Haley .......................... 52/376 |
| 2,181,938 A | * | 12/1939 | Fine ............................ 52/292 |
| 2,524,390 A | | 10/1950 | Lau Bach et al. |
| 2,826,800 A | * | 3/1958 | Van Buren ................ 249/205 |
| 3,034,209 A | | 5/1962 | Bianca et al. |
| 3,099,220 A | | 7/1963 | Butman |
| 3,170,201 A | | 2/1965 | Nofziger |
| 3,196,990 A | | 7/1965 | Handley |
| 3,217,459 A | | 11/1965 | Meyer |
| 3,276,182 A | * | 10/1966 | Handley ...................... 52/844 |
| 3,280,525 A | | 10/1966 | Crowley |
| 3,360,288 A | | 12/1967 | Holscher |
| 3,408,784 A | | 11/1968 | Crowley |
| 3,561,890 A | | 2/1971 | Peterson |
| 3,713,262 A | * | 1/1973 | Jatcko .......................... 52/98 |
| 3,728,837 A | | 4/1973 | Kiefer, Jr. |
| 3,869,530 A | | 3/1975 | Williams |
| 3,963,056 A | | 6/1976 | Shibuya et al. |
| 3,974,756 A | | 8/1976 | Long |
| 4,007,574 A | * | 2/1977 | Riddell ...................... 52/302.3 |
| 4,015,383 A | | 4/1977 | Crowley |
| 4,026,582 A | | 5/1977 | Abe et al. |
| 4,044,088 A | | 8/1977 | Hume |
| 4,045,929 A | | 9/1977 | Dalbrenta |
| 4,092,811 A | | 6/1978 | Lin et al. |
| 4,155,210 A | | 5/1979 | de Leaumont |
| 4,180,369 A | | 12/1979 | Ottosen |
| 4,184,084 A | | 1/1980 | Crehore |
| 4,187,660 A | | 2/1980 | Lin et al. |
| 4,190,993 A | * | 3/1980 | Pohlman et al. .............. 52/249 |
| 4,232,495 A | | 11/1980 | Lin et al. |
| 4,248,025 A | * | 2/1981 | Kleine et al. ................ 52/845 |
| 4,270,323 A | | 6/1981 | Crowley |
| 4,272,929 A | | 6/1981 | Hanson |
| 4,327,703 A | * | 5/1982 | Destree .......................... 125/1 |
| 4,340,882 A | | 7/1982 | Maio et al. |
| 4,395,857 A | | 8/1983 | Sheets, Jr. et al. |
| 4,447,738 A | | 5/1984 | Allison |
| 4,473,976 A | | 10/1984 | Kuznetsov et al. |
| 4,555,888 A | | 12/1985 | Goldenberg et al. |
| 4,662,773 A | | 5/1987 | Baumann et al. |
| 4,909,011 A | * | 3/1990 | Freeman et al. ............ 52/648.1 |
| 4,910,940 A | | 3/1990 | Grady, II |
| 5,038,540 A | | 8/1991 | Krautz |
| 5,066,167 A | | 11/1991 | Siegfried et al. |
| 5,109,953 A | | 5/1992 | Mathis |
| 5,115,588 A | | 5/1992 | Bronsart et al. |
| 5,117,607 A | | 6/1992 | Bourdon |
| 5,289,041 A | | 2/1994 | Holley |
| 5,375,353 A | | 12/1994 | Hulse |
| 5,396,674 A | * | 3/1995 | Bolds ............................ 5/633 |
| 5,419,683 A | | 5/1995 | Peace |
| 5,513,477 A | | 5/1996 | Farber |
| 5,527,216 A | | 6/1996 | Senanayake |
| 5,568,709 A | | 10/1996 | Steckler |
| 5,675,956 A | | 10/1997 | Nevin |
| 5,809,711 A | | 9/1998 | Werner |
| 5,864,998 A | | 2/1999 | Loomer |
| 5,870,877 A | * | 2/1999 | Turner ...................... 52/651.02 |
| 5,987,845 A | | 11/1999 | Laronde |
| 6,094,881 A | * | 8/2000 | Lockwood .................. 52/845 |
| 6,157,088 A | | 12/2000 | Bendix |
| 6,270,308 B1 | | 8/2001 | Groppel |
| 6,400,039 B1 | | 6/2002 | Wobben |
| 6,408,575 B1 | | 6/2002 | Yoshida et al. |
| 6,467,233 B1 | * | 10/2002 | Maliszewski et al. ......... 52/831 |
| 6,470,645 B1 | | 10/2002 | Maliszewski et al. |
| 6,532,700 B1 | | 3/2003 | Maliszewski et al. |
| 6,705,058 B1 | | 3/2004 | Foust et al. |
| 6,851,231 B2 | * | 2/2005 | Tadros et al. ................ 52/223.4 |
| 6,907,706 B1 | | 6/2005 | Schippmann et al. |
| 7,096,639 B2 | | 8/2006 | Wobben |
| 7,114,295 B2 | | 10/2006 | Wobben |
| 7,156,037 B2 | | 1/2007 | Borgen |
| 7,160,085 B2 | | 1/2007 | de Roest |
| 7,276,808 B2 | | 10/2007 | Weitkamp et al. |
| 7,343,718 B2 | * | 3/2008 | Foust et al. ................ 52/745.17 |
| 2002/0095878 A1 | * | 7/2002 | Henderson ................... 52/116 |
| 2002/0124502 A1 | | 9/2002 | Henderson |
| 2003/0071468 A1 | | 4/2003 | Platt |
| 2004/0098935 A1 | * | 5/2004 | Henderson ................... 52/296 |
| 2005/0042099 A1 | | 2/2005 | Wobben |
| 2005/0201855 A1 | | 9/2005 | Fan |
| 2006/0156681 A1 | * | 7/2006 | Fernandez Gomez et al. ................................................... 52/721.1 |
| 2006/0213145 A1 | * | 9/2006 | Haller ...................... 52/651.01 |
| 2006/0225379 A1 | | 10/2006 | Seidel et al. |
| 2006/0267348 A1 | * | 11/2006 | Weitkamp et al. .............. 290/55 |
| 2006/0272244 A1 | * | 12/2006 | Jensen ...................... 52/223.5 |
| 2007/0294955 A1 | | 12/2007 | Sportel |
| 2008/0034675 A1 | | 2/2008 | Kristensen |
| 2008/0040983 A1 | * | 2/2008 | Fernandez Gomez et al. .. 52/40 |
| 2008/0078128 A1 | * | 4/2008 | Livingston et al. ............. 52/40 |
| 2008/0209842 A1 | * | 9/2008 | Montaner Fraguet et al. ................................................... 52/651.07 |
| 2009/0000227 A1 | * | 1/2009 | Jakubowski et al. ....... 52/223.4 |
| 2009/0025304 A1 | | 1/2009 | Irniger et al. |

FOREIGN PATENT DOCUMENTS

| | | |
|---|---|---|
| CA | 2 561 431 | 10/2005 |
| CA | 2 600 853 | 9/2006 |
| DE | DT 25 08 470 | 2/1975 |
| DE | 32 43 357 | 6/1983 |
| DE | 38 42 026 | 7/1990 |
| DE | 4023465 | 2/1992 |
| DE | 41 00 995 | 7/1992 |
| DE | 298 09 540 U1 | 2/1999 |
| DE | 198 32 921 | 2/2000 |
| DE | 199 36 603 | 2/2001 |
| DE | 20 2007 003 842 | 5/2007 |
| EP | 0 960 986 | 12/1999 |
| EP | 1 156 175 | 11/2001 |
| EP | 1 262 614 | 12/2002 |
| EP | 1 269 016 | 1/2003 |
| EP | 1 561 883 | 10/2005 |
| EP | 1 624 137 | 2/2006 |
| EP | 1 767 729 | 3/2007 |
| EP | 1 857 670 | 11/2007 |
| EP | 1 876 316 | 9/2008 |
| ES | 1 061 396 | 2/2006 |
| FR | 544863 | 10/1922 |
| FR | 1 145 789 | 10/1957 |
| FR | 2 621 343 | 4/1989 |
| FR | 2 749 342 | 12/1997 |
| JP | 55 32813 | 3/1980 |
| JP | 58 159359 | 9/1983 |
| JP | 61 081979 | 4/1986 |
| JP | 61 282562 | 12/1986 |
| JP | 9 195584 | 7/1997 |
| JP | 9 235912 | 9/1997 |
| JP | 2000 191280 | 7/2000 |
| JP | 2000 283019 | 10/2000 |
| JP | 3074144 | 10/2000 |
| JP | 36 016593 | 5/2003 |
| JP | 2004 011210 | 1/2004 |
| NL | 7801565 | 8/1979 |
| WO | WO-86 02689 | 5/1986 |
| WO | WO-02 01025 | 1/2002 |

| | | |
|---|---|---|
| WO | WO02/04766 A2 | 1/2002 |
| WO | WO-03 100178 | 4/2003 |
| WO | WO 03 067083 | 8/2003 |
| WO | WO-03/069099 | 8/2003 |
| WO | WO-03 083236 | 10/2003 |
| WO | WO-2004 007955 | 1/2004 |
| WO | WO2004/007955 A1 | 1/2004 |
| WO | WO-2007 025947 | 3/2007 |
| WO | WO-2008 110309 | 3/2008 |
| WO | WO-2008110309 | 9/2008 |

OTHER PUBLICATIONS

Development of the Concrete Tower for Large Scale Wind Power Generating System; Kiyoroku Fukayama et al (PC Bridge Company Limited).

Danish wind turbines (1): Portrait of Micon's 250 kW turbine; by Strange Skriver, technical consultant of Danish Wind Turbine owner's Association.

\* cited by examiner

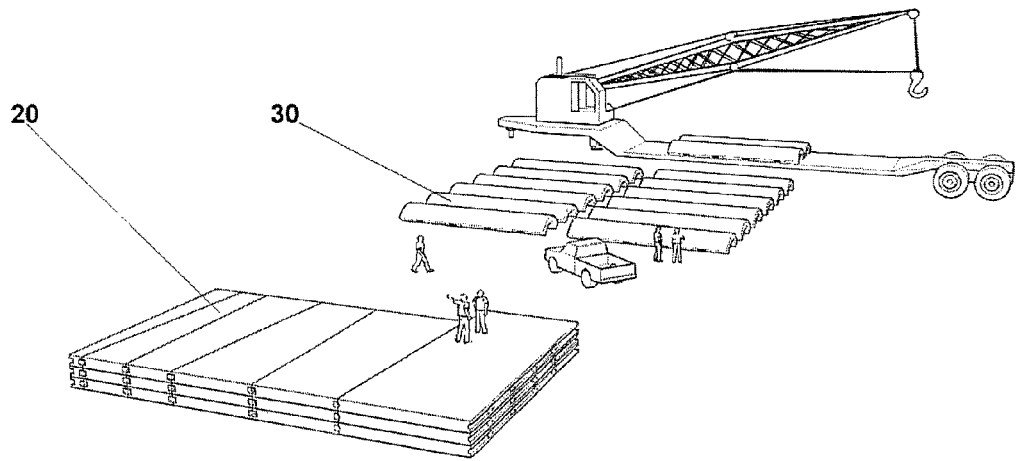
FIG. 2
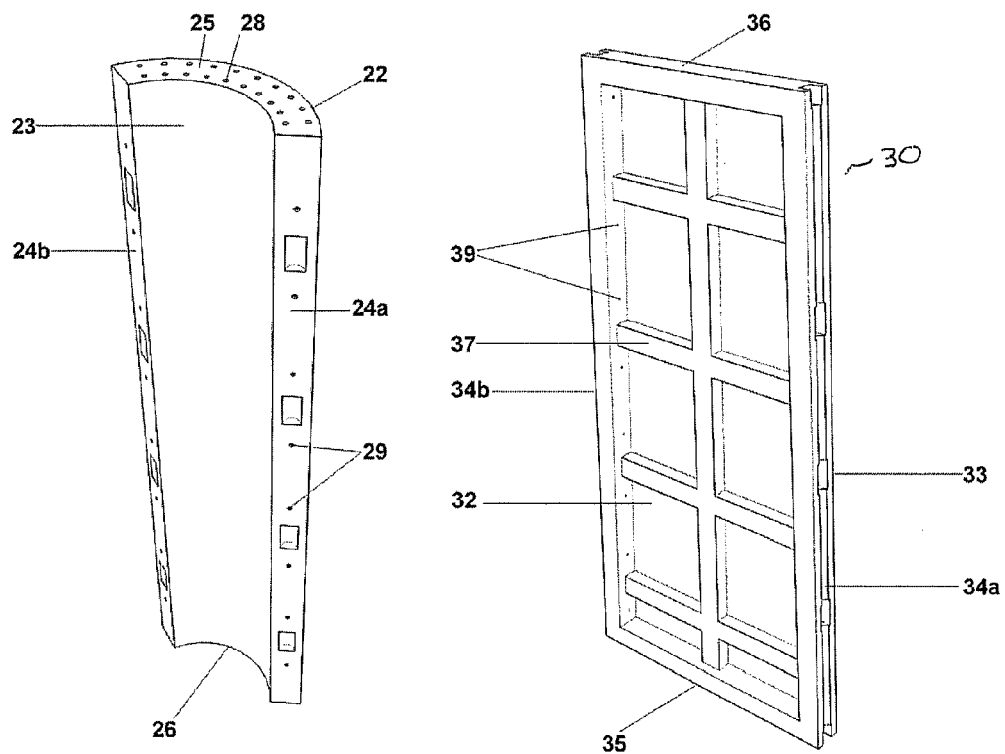
FIG. 3
FIG. 4

PRE-STRESSED CONCRETE TOWER FOR WIND POWER GENERATORS

This nonprovisional application is a continuation of International Application No. PCT/IB2007/003319, which was filed on Nov. 2, 2007, and this nonprovisional application claims priority under 35 U.S.C. §119(a) to Mexican Patent Application No. MX/a/2007/009456, which was filed in Mexico on Aug. 3, 2007, and which are both herein incorporated by reference.

BACKGROUND OF THE INVENTION

1. Field of the Invention

This application relates to a pre-stressed concrete tower for wind-power generators, particularly post-tensioned concrete, its design and constructive process, the towers include a cylinder divided in three substantially equal semi-circular sectors, arranged to form a pyramid. The three concrete sectors are joined together with concrete prefabricated slabs forming a triangle, to form a tower having variable cross-sections, which ends in a circular section at its upper end. Both the semi-circular segments and the slabs are pre-fabricated into sections that allow them to be erected, joined together and attached to a foundation, by prestressing cables. The prefabricated parts, because of their size, can be fabricated on-site, thus avoiding the need to be transported.

2. Description of the Related Art

Towers of several designs have been proposed for wind-power generation. For example, several different towers have been built, having metal structures based on armatures; also, they have been built with tubular sections. In both cases, their height is limited because of their dimensions, the turbulence caused by the air, their strength against intense earthquakes, and their ease of building, because in many cases it is not practical for the heights presently used.

Also, towers of the prior art are known such as those described in U.S. Pat. No. 2,826,800, on a conical tower built into concrete segments joined by tension elements.

Also, the German utility model DE 29809540U describes a segmented pre-stressed concrete tower for wind-energy generators. According to this publication, conical frustrum (i.e., truncated conical) segments are fabricated in-plant, which later are erected and joined together. According to the publication, towers of two hundred meters' height, or more, can be erected in this way.

According to International Patent WO-2004/007955, a construction system for conical segmented towers is described. This publication describes the use of molds for in-shop fabrication of each concrete segment. The concrete segment includes a series of ducts. When the segments are erected, pre-stressing elements are run into the ducts to protect their structural integrity.

The segmented-concrete tower systems of the prior art, each have at least the following drawbacks. Frustro-conical segments require one mold for each segment that is to be constructed. Moreover, because of their sizes such molds are complex and costly, some of them having approximately 6.5 meters in diameter and 4 meters' in height. In addition, they must be used in a facility for pre-fabricating the concrete segments. The transportation to the site of these pre-fabricated sections, which can weigh more than 60 metric tons, must be carefully planned, using thereby big cranes and flat-cars adequate for their size. Because there are a multiplicity of different molds, the joining of the pieces is a difficult factor, requiring complex devices to accomplish this joining. This is the case of Patent WO-02/04766. The erection of these sections must be done with large-capacity cranes, using very high scaffolds, which influences the cost of said erection.

SUMMARY OF THE INVENTION

It is therefore an object of the present invention to provide a tower for wing power generators wherein a cylindrical shape (constant diameter) is split into three equal semi-circular segments arranged in a tripod, thereby forming a pyramid, thus simplifying their fabrication and erection.

Another objective of the invention is to simplify the molding, because only one curved mold for curved parts is needed, thus achieving precision and economy.

The rest of the tower's section is complemented with flat concrete segments, horizontally fabricated on a template, using perimetral molds at its sides.

Another object of the invention is that the constructive parts for the tower can be selected.

Another object of the invention is to be able to pre-fabricate the different elements, not only at the shop or facility, but also at the tower's building site, thus saving or eliminating the need to transport the segments.

Further, another objective of the invention is to simplify its erection, by means of a sectionalized metallic erecting column, installed at the tower's axis, whose purpose is to maintain the geometry of the tower when the different circular and flat segments are erected, by attaching them to said column.

This same central column serves as a staircase during the building, for safely accessing the working sites, during the erection.

The erecting column has, as accessories, work-platforms, installed where they are needed. This sectionalized metal column can be removed when the erection process is finished.

The structural integrity of the tower is achieved by means of pre-stressed cables, which attach the semi-circular segments to the foundation and also between them and to the flat segments.

The above objectives are achieved through providing a segmented concrete tower, as well as through a method for building the tower, comprising:

(a) fabricating, at the tower's site or in-shop, a plurality of pre-fabricated elements including: (i) semi-circular segments made of concrete, and (ii) flat segments, of rhomboidal shape, and ribbed; The pre-fabricated segments having internal ducts to house the pre-stressing cables;

(b) prefabricating a plurality of erection-column segments, which can be metallic, having arms that axially extend from the column's axis, for installing and supporting the flat segments, and which can be disassembled at the end of the building of the tower, and which can be re-used for the erection of further towers;

(c) building a foundation for the tower, and a concrete hardstand, with a leveled and smoothed surface finish, such hardstand being aside to the tower's foundation;

(d) mounting on the foundation, a first segment of the erection column, which will serve for all the purposes of the mounting;

(e) installing, with the aid of, for example, a crane, a first flat segment, of the three forming a first section of the tower, fixing it to the foundation, and supporting it to erect the column, tilting the segment to present it in its final position, by the mounting column's arm;

(f) installing a second and a third segment of the first section of the tower, following the same routine as that for the first one;

(g) installing the first, second and third semi-circular segments, leaning them on two of the neighboring flat segments, in order to complete the first section;

(h) passing the pre-stressing cables through the ducts into the prefabricated segments in order to join them to others and to the foundation, tensioning the cables and pouring concrete into the ducts of the first section of the tower;

(i) mounting the second and following sections of the tower, through installing their respective mounting columns and flat and semi-circular segments, until reaching the tower's height;

(j) passing the pre-stress cables through the pre-fabricated segments' ducts for each section of the tower, for joining each segment to the subjacent and over-lying respective segment, tensioning the cables and pouring concrete into the ducts of every section of the tower; and (l) mounting a capping ring on the tower's top, over the upper three semi-circular segments.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein:

FIG. 2 shows the pre-fabricated concrete semi-circular segments and the stacked flat segments.

FIG. 3 shows a pre-fabricated semi-circular segment with its ducting for pre-stressing cables.

FIG. 4 shows a flat segment viewed from the interior, with integrated reinforced concrete ribs.

DETAILED DESCRIPTION

A detailed design and building process of pre-stressed concrete towers for wind power generators is described, having a cylinder split into three substantially equal semi-circular sectors arranged in a pyramid. The three cylindrical concrete sectors are joined to themselves through prefabricated flat reinforced concrete slabs, of a triangular form, in order to form a variable-section tower, its upper part being capped by a circular section.

The segmental post-tensioned concrete tower for wind power generators is characterized by the ease of its geometric conception, based on a cylindrical form (constant diameter) split into three equal semi-circular sectors arranged as a tripod to form a pyramid; they have the double objective of using only one standard curved mold, and joining the flat parts which complement the section, which are horizontally fabricated on a concrete template.

The constructive development for the tower, designed in order to nave a reinforced and pre-stressed concrete structure in a unique, rapid and economical way, includes a body 100 having a plurality of pre-fabricated elements having: (i) semi-circular segments 20 of concrete, and (ii) flat segments 30. The tower is slender, having an asthetic appeal without impairing the structural properties necessary for supporting the loading to which it will be subjected, such as its own weight, the weight and movement of the blades, wind thrust, seismic forces, etc.

The height of the structure above the ground can vary, according to the type of power generator being used. The tower's geometry is dimensioned and controlled in order to comply with all extreme conditions of the service, and the ultimate limits in the various current building codes.

According to the present invention, a tower is described comprising a body 100 comprising a structure formed by semi-circular segments 20, of reinforced- and pre-stressed (post-tensioned) concrete, combined with flat segments 30. The cross section of the tower's body 100 decreases as a function of its height.

Figure 15:
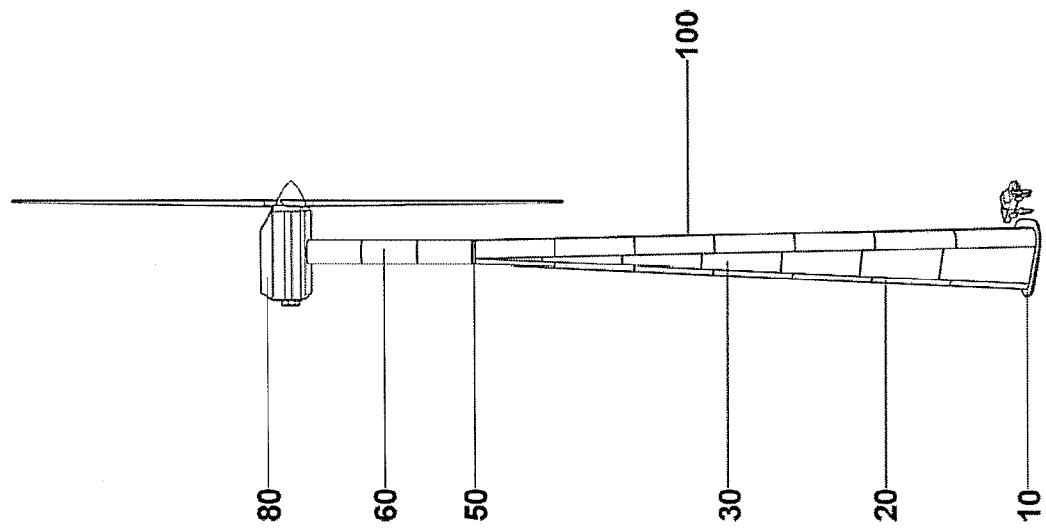
FIG. 15 illustrates a finished power-generating tower.
Figure 14:
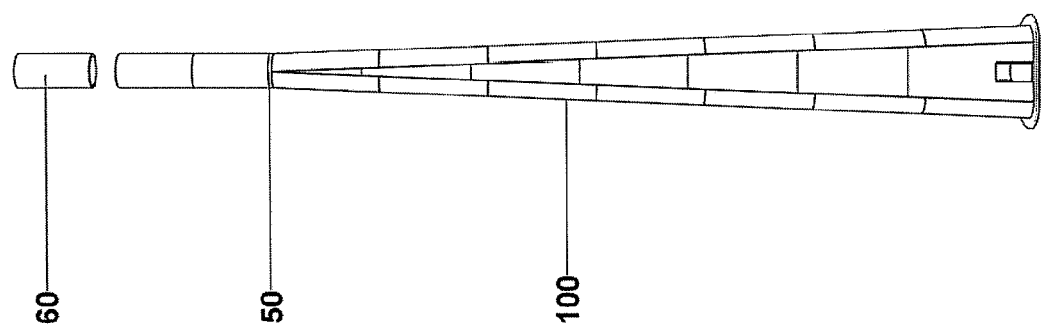
FIG. 14 shows the erection of the cylindrical segments.

In one embodiment of the invention, the tower presents, as seen from a side, two sections distinguishable from each other by their geometry: a body 100 having a variable cross section from its base to approximately two thirds of its height, and one extension 60, having a constant cylindrical section, in its upper part, which can form approximately one third of the total height of the tower (FIGS. 14, 15).

Figure 11:
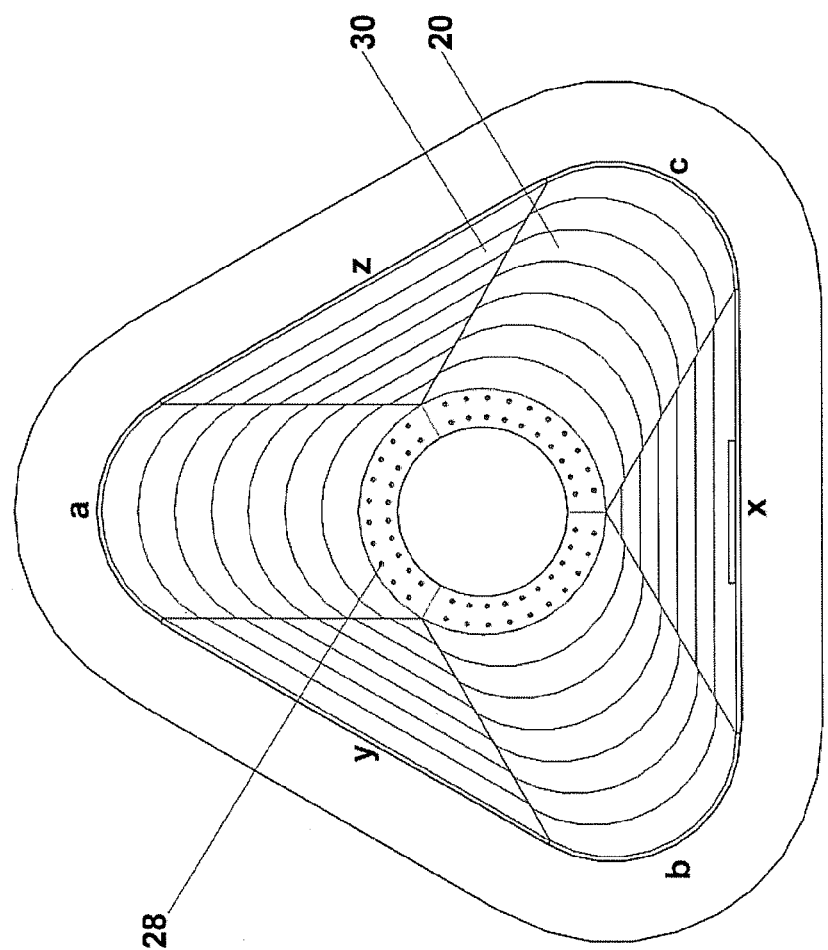
FIG. 11 shows a top view of the pyramidal tower of FIG. 10.
Figure 13:
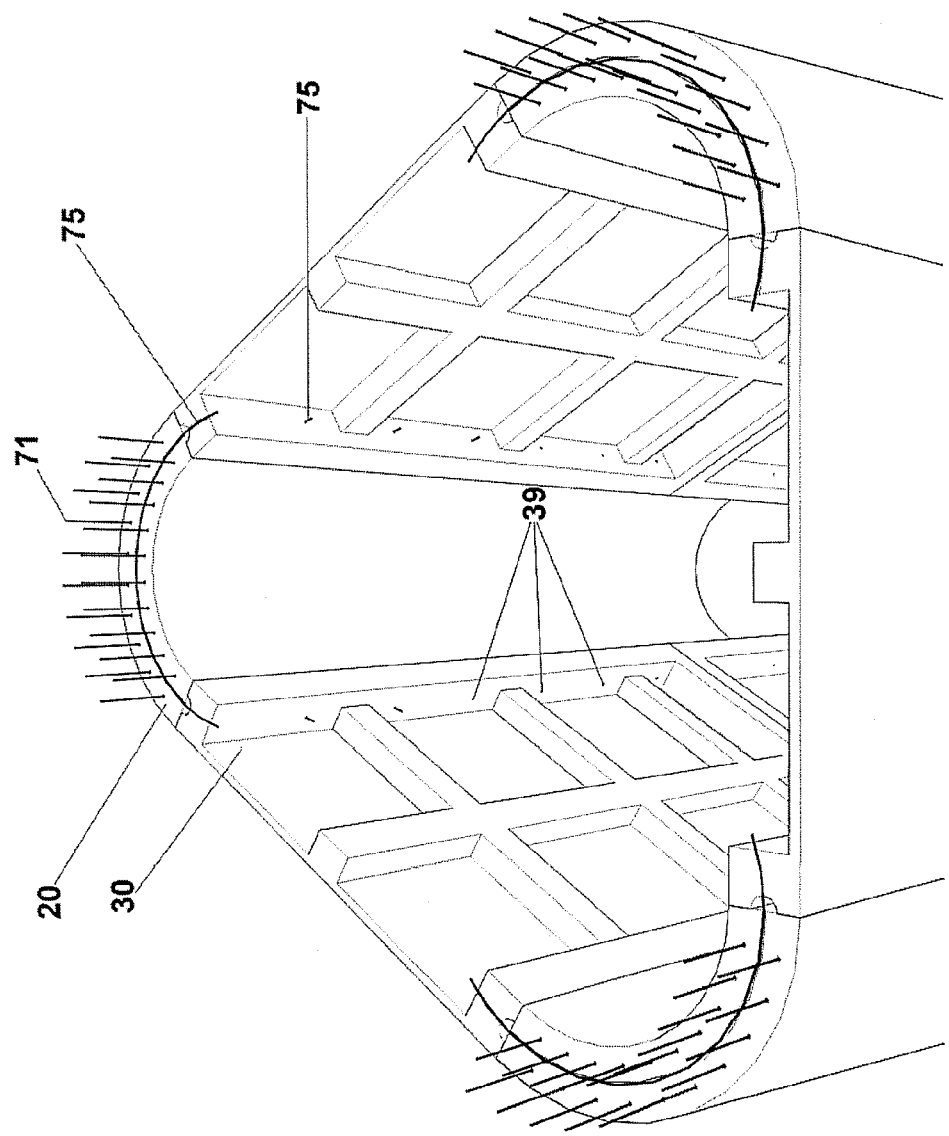
FIG. 13 shows the pre-stressing cables web into the pre-fabricated segments' ducts.

As illustrated in FIGS. 11 and 13, the body 100 of the tower has an axi-symmetrical cross section, whose perimeter can be likened to a triangle with straight sides (x, y, z) and rounded vertices (a, b, c), herein after named triangular cross section. The triangular cross section of at least a portion of the tower's body decreases as a function of the tower's height, forming a pyramidal structure, as viewed from a side. That is, it thins out as its height increases.

The tower comprises three flat walls "x", "y", and "z", illustrated in FIG. 11, separated in-between and segmented, extending between the vertices of the triangular cross section along the tower, forming the flat faces of the tower. Each flat wall comprises a plurality of flat concrete segments 30. Each rounded wall comprising a plurality of circular concrete segments 20.

FIG. 4 shows a concrete flat segment 30. The flat segment 30 has an internal face 32, an external face 33, two long sides 34a, 34b, a bottom side 35, and one upper side 36. Each flat segment 30 comprises reinforcing ribs 37. The arrangement of the ribs can be done according to any known method. Preferably, the webbing should extend vertically, horizontally, in crossings, or diagonally and it should also form a framework along the perimeter of the flat segment 30.

Also, the flat segments incorporate horizontal ducts 39 for running horizontal pre-stressing cables 75 into them. The horizontal ducts 39 are aligned to the corresponding horizontal ducts 29 of the semi-circular segments 20. Through each of these ducts, at least one pre-stressing cable is introduced and, by the action of the cables 75, the flat- and rounded walls remain firmly attached, thereby forming a structure which works as a monolithic structure. In FIG. 13 the horizontal 29, 39 and vertical ducts 28 as well as the pre-stressing cables 71, 75 are depicted. A portion of horizontal duct 29 is shown, and also a portion of horizontal duct 39 in the flat segment 30, before running in the pre-stressing cables is shown.

Figure 10:
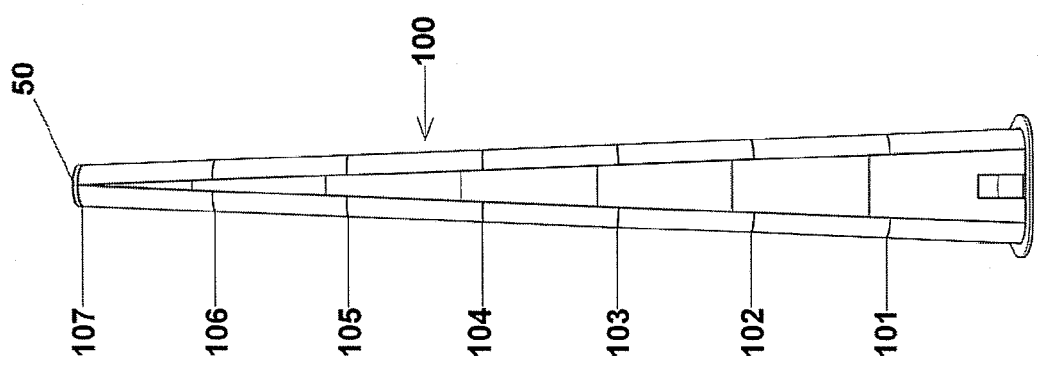
FIG. 10 shows an erected pyramidal tower.

Each of the flat segments 30 have an elongated- and rhomboidal form, such that the upper side 36 is narrower than the bottom side 35. As FIGS. 10 and 11 show, the flat segments 30 installed at the uppermost part of the triangular cross section in the tower, are of a triangular form. In this portion of the tower, the cross section of it turns circular, because the semi-circular segments 20 are joined and form a complete circumference.

The flat segments 30 are preferably fabricated at the building site. Thus, substantial savings are obtained by eliminating the need to transport the segments from the shop to the tower building site. However, as will be evident for a person skilled in the art, the flat segments 30 can be shop-fabricated. Also, the shop can be advantageously located at the building site.

For the fabrication of the flat segments 30, molds are employed which limit the periphery of segments and ribbings. The flat segments are molded by pouring and curing concrete in layers, over a concrete hardstand (FIG. 2). Between layers, a mold releaser is inserted, which prevents the segments from sticking together. For convenience, first the flat segments corresponding to the upper sections in the tower are manufactured by pouring and curing; then, the segments for the intermediate sections and finally, the segments for the bottom sections are formed. This way, the flat segments will be lifted and erected as the building of the tower proceeds, without needing to move the flat segments 30 which have already been poured and are in the bottom layers.

Before pouring the concrete, it is possible to include attachments to the flat segments for allowing, for example, ducting for electrical installation. Also, the ducts for the pre-stressing cables can be incorporated.

As will be apparent from the figures, the flat segments 30 are mounted with their ribbing facing towards the tower's interior, while the smooth face forms the exterior surface of the tower. However, the ribbed face of the flat segments can be selected to be the external surface of the tower.

The tower comprises three rounded walls, "a", "b", and "c", separated from each other, extending along the tower in the vertices of the triangular section, between the flat walls "x", "y", and "z", and joined to them. Every rounded wall includes a plurality of semi-circular segments 20, made of concrete that is stacked vertically and post-tensioned.

As will be apparent in FIGS. 10 and 11, at the vertices of the tower's triangular cross-section, the rounded walls are installed, made of the semi-circular segments 20, between the flat segments 30 which extend along the body 100 of the tower.

The decrease in the tower's cross section is achieved by gradually reducing the width of the flat walls "x", "y", and "z" made of flat segments 30, but without modifying the dimension of the semi-circular segments 20, until the semi-circular segments 20 converge forming a circular ring. See FIGS. 10, 11. Also, the tower optionally includes a ring 50, the ring having the task of uniformly distributing the vertical loads onto the semi-circular walls.

The semi-circular segments 20, forming the concrete structure of the tower, are pre-fabricated and erected on-site.

According to the present invention, the semi-circular segments 20 are foreseen having the same dimensions and form. Their form is that of a semi-circular cylinder segment of 120°. This approach, in contrast to towers built according to previous technique, does not require special molds to manufacture each segment for the tower. According to an embodiment, only one type of mold can be used to fabricate all semi-circular segments 20. It is worth to mention that the weight of the semi-circular segments 20 is approximately ⅙ of the total weight of a complete frustro-conical section that is made according to prior art techniques. Such a difference in weight allows a safer and easier erection of the segments.

FIG. 3 illustrates a semi-circular segment 20. The segment has an external face 22 and an internal face 23, and has two lateral edges 24a, 24b of a suitable thickness. Also, the semi-circular segment 20 has an upper or top side 25, and a bottom side 26, along the surface of the segment 20, parallel to the edges 24a, 24b there is a plurality of horizontal ducts 29 and vertical ducts 28, for introducing the pre-stressing cables 75. Into the horizontal ducts 29 of the semi-circular segments 20, and into the horizontal ducts 39 of the adjacent flat segments 30, pre-stressing cables 75 are introduced and secures, for joining the semi-circular segments 20 to the adjacent flat segments 30. Also, into the vertical ducts 28 of segments 20, the pre-stressing cables 71 are introduced, in order to join the overlying and underlying circular segments. The vertical 71 and horizontal 75 pre-stressing cables are introduced and secured by means and methods known to one skilled in the art.

The pre-stressing cables can be substituted by pre-stressing strands or any suitable pre-stressing element, anchored to the tower's foundation, which are installed and post-tensioned inside the semi-circular segments in order to provide the continuity of the rounded semi-circular walls. FIG. 13 illustrates the pre-stressing elements for one section of the tower, according to the present invention.

Sidewise, the semi-circular segments 20 are connected to the flat segments 30 by vertical pre-stressing cables, thus allowing to operate as a whole- or monolithic section. To that end, the semi-circular segments comprise ducts which are aligned to corresponding ducts in the flat segments 30.

Once the tower is built and is operating, the flat walls provide resistance against vertical- and horizontal loads, mainly the loads due to the movement of the wind power generator blades, the wind thrust and seismic forces.

The circular segments 20, on their part, provide the necessary resistance to the tower for supporting the weight of the power generator, and the tower's own weight.

According to present invention, the cylindrical segments can be fabricated simultaneously to the erection of the tower, being lifted at the proper time by means of a crane, laid on the tower, and fastened to it by means of pre-stressing elements, such as cables or strands, which are laid, ducted and post-tensioned inside the modules' walls, in a way known to an person skilled in the art.

The molds for cylindrical segments are conditioned, thus incorporating columns for pre-stressing cables or strands and other attachments, and then a vertical pouring of concrete is done; the molds can be stripped the next day. Thus, the molds are used every other day. The quantity of molds is unlimited, and the number of units to be used depends on the magnitude of the construction and on its building schedule.

According to the present invention, a considerably lower quantity of molds can be used, in contrast to those used in the building methods for stack-type towers according to the prior art.

Figure 5:
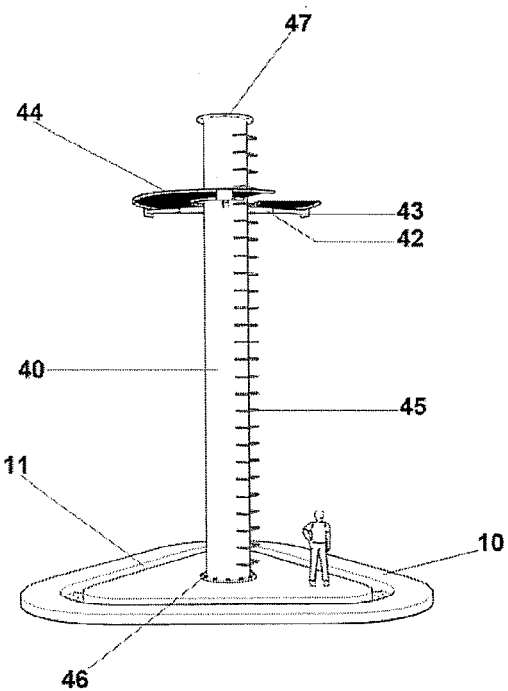
FIG. 5 shows the foundation and the first segment of metallic erection column.

According to the present invention, in the erection of the tower a sectionalized erection column is used, installed in the tower's interior. The erection tower includes a plurality of erection column segments 40, stacked one above the other, during the erection of the tower as depicted in FIG. 5. Each erection column segments includes stair treads 45 to climb, and a scaffold 44 for the building personnel.

Figure 6:
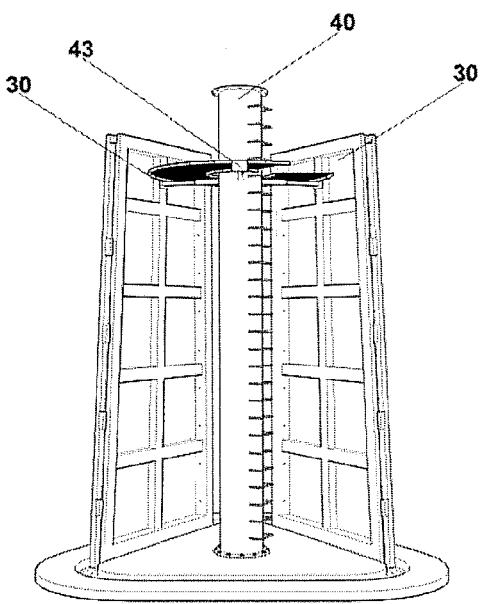
FIG. 6 shows the first two flat segments attached to the erection column, and a working platform supported by the erection column.

As is apparent in FIGS. 5 and 6, each segment 40 of the column has radial arms 42, extending outwards from the surface of the column 40. The arms 42 can be retractable, in such a manner that they can be retracted to allow the removal of the erection column through the upper part of the tower, before the cylindrical segments 60 and the wind-energy power generator 80 are installed.

The use of three radial arms is preferred. Each radial arm has, on its distal-end from the erection column's segment, a mounting plate 43, such that when laying a flat segment 30, it can be supported on the plate. Also, the scaffold 44 lies over the arms 42, so that the construction people can maneuver during the assembly of the segments.

Also, each erection column segment 40 has one bottom flange 46 for joining said erection column segment 40 with the foundation or with a subjacent segment 40, and one top flange 47 for joining the erection column segment 40 to a upper-adjacent column 40, in order to be laid over a previously installed one.

Figure 1:
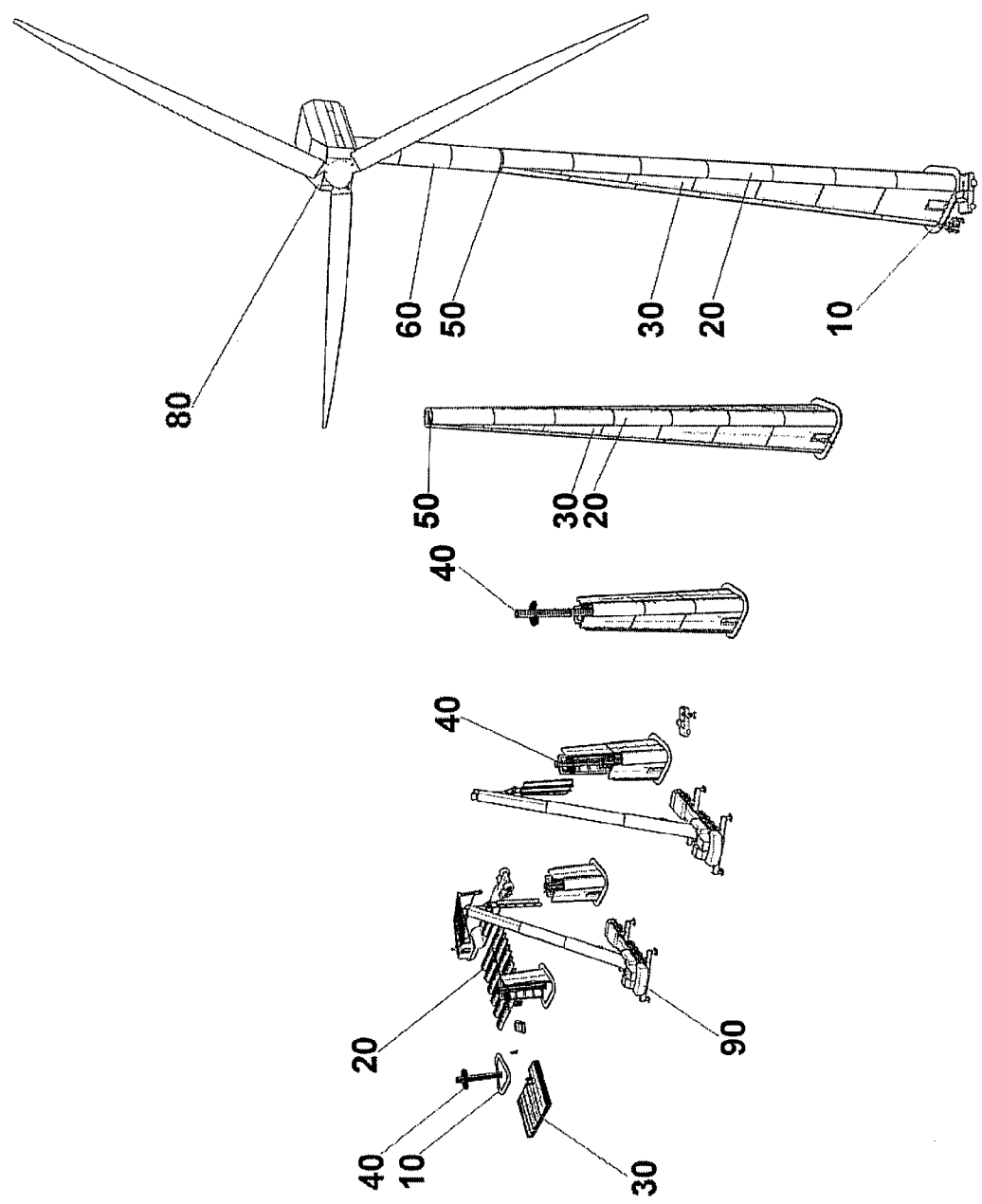
FIG. 1 illustrates the building process for the tower, according to an embodiment of the present invention.
Figure 7:
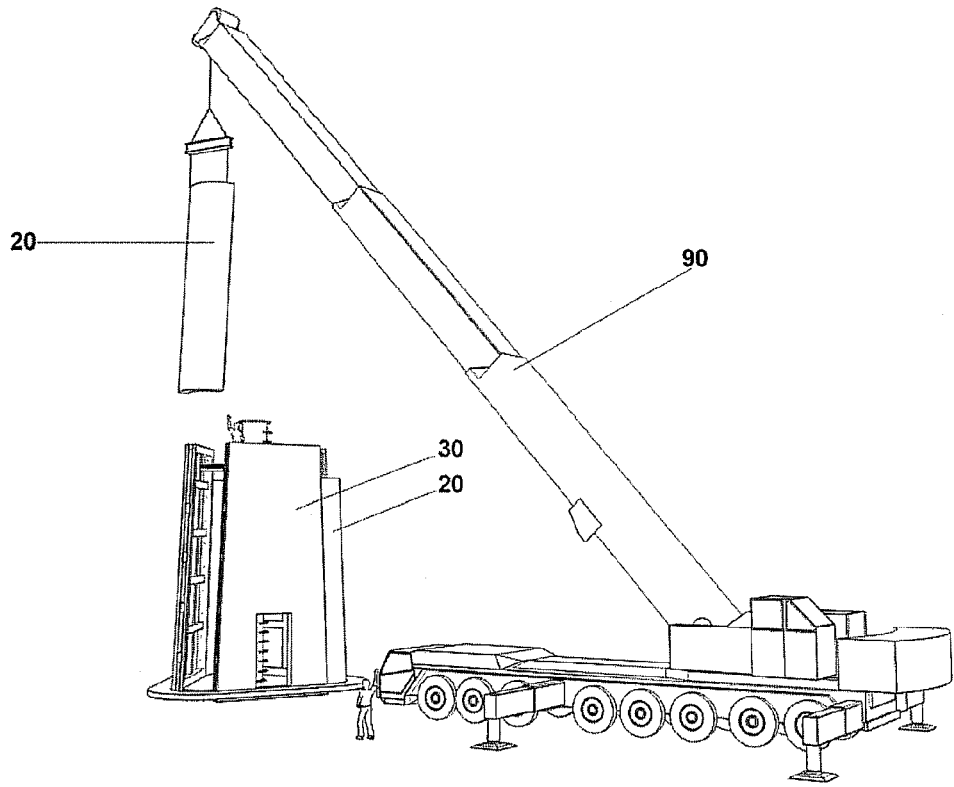
FIG. 7 shows the erection of the semi-circular segments, leaning them on the flat segments, of the first section.
Figure 8:
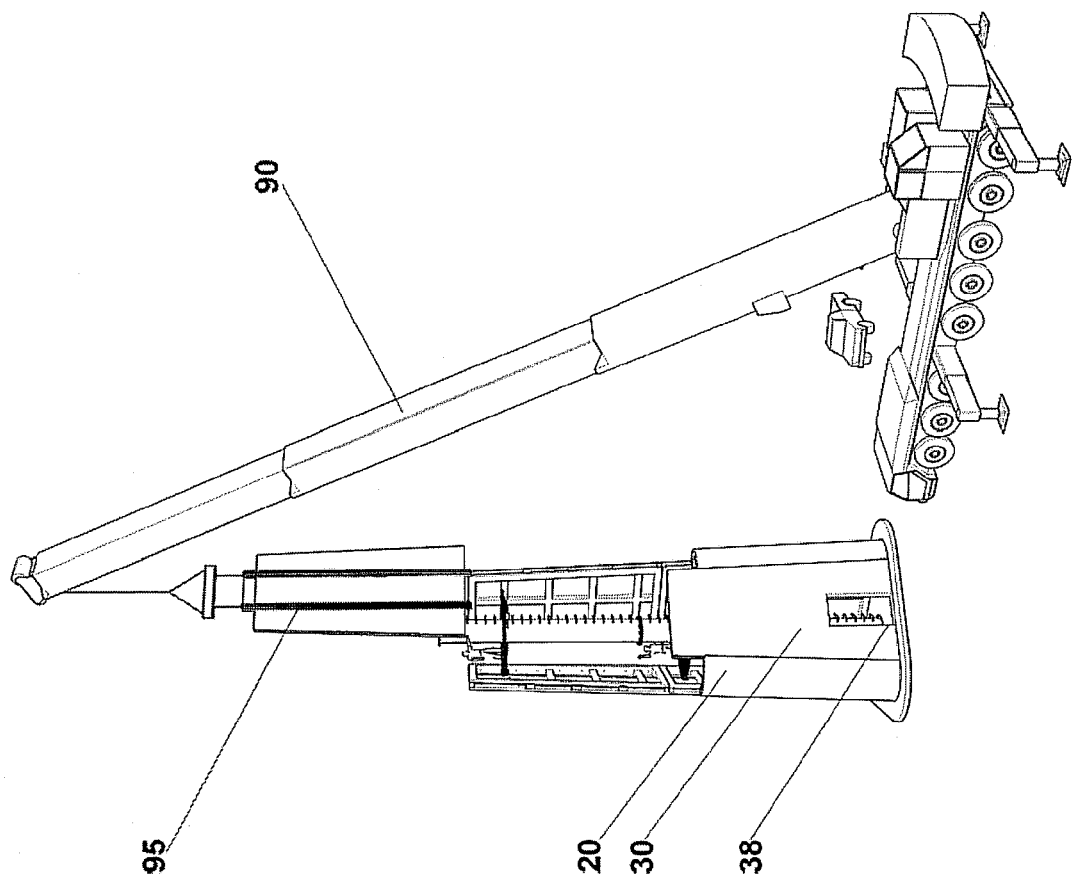
FIG. 8 shows the erection of the tower's second section, at a greater height.

The forming and pouring for the concrete semi-circular segments 20, the flat segments 30, the cylindrical segments 60 for the erection and assembling of the tower is preferably done on-site, according to following process, which is also illustrated in FIG. 1:

(a) to fabricate, at tower's building site or at a shop, a plurality of pre-fabricated elements including: (i) semi-circular segments made of concrete, and (ii) flat segments, of rhomboidal shape and ribbed, these pre-fabricated elements having internal ducts for introducing pre-stressing cables (FIGS. 2, 3 and 4);

(b) to prefabricate a plurality of metallic erection column segments, having arms that extend radially from the column's axis, for installation of the flat segments;

(c) to build one foundation for the tower and one concrete hardstand, leveled and having a smooth surface finish, adjacent to tower's foundation;

(d) on the tower's foundation, to mount the first erection column segment, which will serve for all erection purposes (FIG. 4);

(e) to install, with a crane, a first flat segment, of the three which together form a first section of the tower, fix it on the foundation and leaning it on the erection column, and tilt and mount the segment in its final position, with the erection column's arm (FIGS. 5 and 6);

(f) to install the second and third flat segments of the tower's first section, according to the same routine as for the first segment;

(g) once the flat segments are installed, semi-circular segments are erected to form a whole first section (FIG. 7);

(h) once the first section of the tower, the second erection column segment 40 is installed (FIG. 8), and the corresponding flat segments 30 and semi-circular segments 30 are erected, to form the second section of the tower.

Figure 9:
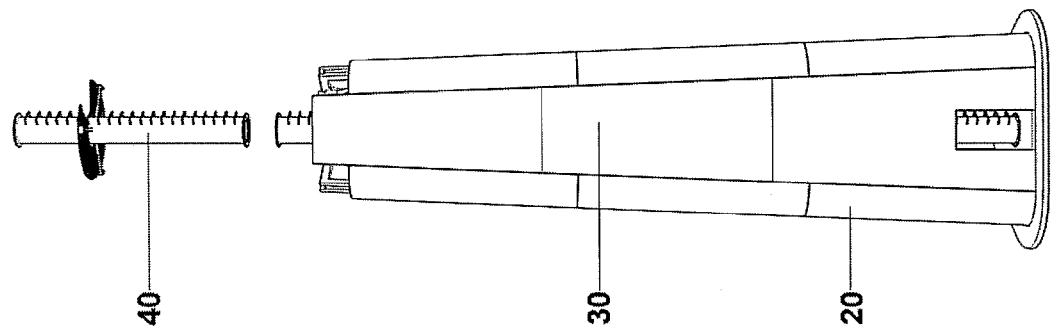
FIG. 9 shows the addition of a segment of the erection column, for continuing the erection of the tower.

The sequence is repeated to form the third and following sections of the tower (FIG. 9). FIG. 10 illustrates a finished body of the tower, having seven sections 101, 102, 103, 104, 105, 106 and 107. The flat segments of section 107 are triangular in shape. Evidently, the above description depends on the tower's height and of the dimensions of the flat segments; thus, the number of sections and the number of flat-and semi-circular segments for each section depends on the tower's design, as will be evident to a person skilled in the art. All such possible designs are included within the scope of present invention.

Figure 12:
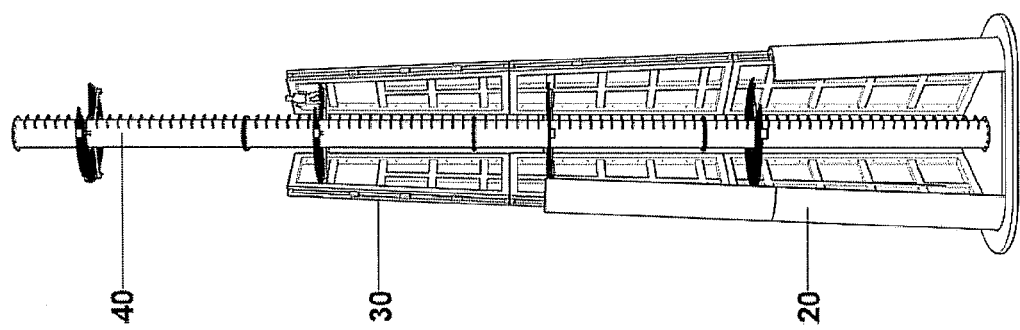
FIG. 12 illustrates the setup of the erection column segments.

Both the semi-circular segments and the flat ones are pre-fabricated in parts, suitable for their mounting, joined together and to the foundation by means of pre-stressing cables. FIGS. 11 and 12 show the tower according to the invention, in an elevation view and a partial vertical section, to show the components, and in a view from above.

According to an embodiment of the invention, which is illustrated in FIG. 14, the tower includes an extension 60. Preferably, the tower's extension 60 includes a cylindrical portion. The cylindrical portion can be made of a metal column, a one-piece cylindrical section made of concrete, or a cylindrical segmented piece made of concrete, which joins to the ring 50. Also, according to the invention, the upper end of the cylindrical extension section comprises one ring (no illustrated) which serves as a flange to support the wind power generator.

In one embodiment of the invention, the extension 60 includes a plurality of cylindrical modules 60, made of pre-stressed concrete, joined together by pre-stressing elements such as cables or strands, installed and post-tensioned within the ducts of said cylindrical modules (not illustrated).

According to the abovementioned embodiment of this invention, the cylindrical modules 60 which form the extension are foreseen as having equal dimensions. In this way, only one type of cylindrical mold is required. As will be evident to a person skilled in the art, one physical mold is not exclusively used, but a plurality of molds having the same characteristics. The molds can be used to fabricate and erect several towers in a wind power energy farm.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A pre-stressed concrete tower for wind-power generators, comprising:
a pyramidal structure having three flat walls and three rounded walls, alternated and joined together to form the pyramidal structure, the pyramidal structure having a triangular cross section with rounded vertices, such that the tower gradually narrows and ends into a circular cross section, the pyramidal structure having a plurality of stepped and stacked pyramidal sections assembled from flat concrete segments and semi-circular concrete segments joined together through horizontal pre-stressing cables being provided within horizontal ducts that are embedded into the semi-circular and flat concrete segments, vertical pre-stressing cables being provided with vertical ducts that are embedded into the semi-circular concrete segments; and
an extension, having a sectioned cylindrical body made only of pre-stressed concrete cylindrical segments.

2. The pre-stressed concrete tower according to claim 1, wherein the rounded walls have substantially the same form and the same dimensions.

3. The pre-stressed concrete tower according to claim 1, wherein the flat walls have a bottom side that is wider than a top side.

4. The pre-stressed concrete tower according to claim 3, wherein the flat walls comprise ribs, that form a framework.

5. The pre-stressed concrete tower according to claim 1, wherein the horizontal ducts in the flat concrete segments are horizontally aligned with the horizontal ducts in the semi-circular concrete segments at a joint surface between the flat concrete segments and the circular concrete segments, such that the horizontal pre-stressing cables extend between and into the horizontal ducts in the flat concrete segments and the horizontal ducts in the semi-circular concrete segments.

6. The pre-stressed concrete tower according to claim claim 1, wherein the horizontal ducts in the flat concrete segments extend through the width of a ribbing forms a framework.

7. The pre-stressed concrete tower according to claim 1, further comprising an internal removable structure having a column with treads for climbing, and scaffolds.

8. A method for erecting a pre-stressed concrete tower for wind power generators, comprising:
 fabricating a plurality of prefabricated elements having concrete semi-circular segments, and flat rhomboidal ribbed segments, the prefabricated parts having internal ducts for pre-stressing cables;
 fabricating a plurality of metallic erection column segments, that include arms that extend axially to an axis of the column for erecting the flat segments;
 building a foundation for the tower;
 mounting on the foundation, a first segment of the erection column;
 installing one first, one second and one third flat segment of a first section of the tower, and fixing the first section flat segments to the foundation and supporting the first section flat segments to the erection column;
 installing the semi-circular segments such that they are adjacent to the flat segments to complete the first section of the tower having a substantially triangular cross section;
 running the pre-stressing cables through the ducts of the flat segments and the semi-circular segments, such that the flat segments and semi-circular segments are fixedly joined together and to the foundation;
 erecting the second and subsequent sections of the tower, by installing the erection columns and the flat and semi-circular segments, until a predetermined height for the tower is reached;
 forming a circular cross section with the three semi-circular segments at the top of the concrete structure; and
 running the pre-stressing cables through the prefabricated segments of each and every section of the tower, for joining each segment to the supra- and subjacent segment, tensioning the cables and pouring concrete into the ducts in each and every section of the tower.

9. The method according to claim 8, wherein the first segment of the erection column is braced to the foundation in such a way that the second and following segments of the column acquire an adequate rigidity and strength when joined to the prior installed column segment, for supporting the pre-fabricated segments for the respective section of the tower.

10. The method according to claim 8, wherein all concrete semi-circular segments are produced with one standard mold.

11. The method according to claim 8, further comprising the step of mounting a tower extension including a cylindrical portion selected among: (a) a plurality of cylindrical pre-stressed concrete sections, joined together by pre-stressing cables or one continuous cylindrical concrete segment.

12. A pre-stressed concrete tower for wind-power generators, comprising:
 a pyramidal structure having three flat walls and three rounded walls, alternated and joined together to form the pyramidal structure, the pyramidal structure having a triangular cross section with rounded vertices, such that the tower gradually narrows and ends into a circular cross-section, the pyramidal structure having a plurality of stepped and stacked pyramidal sections assembled from flat concrete segments and semi-circular concrete segments joined together through horizontal pre-stressing cables,
 wherein the horizontal ducts in the flat concrete segments are horizontally aligned with the horizontal ducts in the semi-circular concrete segments at a joint surface between the flat concrete segments and the semi-circular concrete segments such that the horizontal pre-stressing cables extend between and into the horizontal ducts in the flat concrete segments and the horizontal ducts in the semi-circular concrete segments; and
 an extension, having a sectioned cylindrical body made only of pre-stressed concrete cylindrical segments.

13. The pre-stressed concrete tower according to claim 12, wherein each of the semi-circular concrete segments has a plurality of vertical ducts embedded therein, and a plurality of vertical pre-stressing cables are located within the vertical ducts.

* * * * *